United States Patent [19]

Northup

[11] 4,244,726
[45] Jan. 13, 1981

[54] APPARATUS FOR MANUFACTURING GLASS BOTTLES

[75] Inventor: John D. Northup, 2460 Underhill Rd., Toledo, Ohio 43615

[73] Assignees: Jr. Northup; Nancy Northup Lehrkind; Mary Northup; Ruth B. Northup, ; part interest to each

[21] Appl. No.: 964,739

[22] Filed: Nov. 29, 1978

Related U.S. Application Data

[63] Continuation-in-part of Ser. No. 906,048, May 15, 1978, abandoned.

[51] Int. Cl.$^3$ .............................. C03B 9/14; C03B 9/20
[52] U.S. Cl. ......................................... 65/264; 65/241; 65/263
[58] Field of Search ................. 65/230, 231, 240, 241, 65/263, 264, 79, 80

[56] References Cited

U.S. PATENT DOCUMENTS

| | | | |
|---|---|---|---|
| 403,716 | 5/1899 | Ashley | 65/263 |
| 617,948 | 1/1899 | Blue | 65/241 |
| 733,805 | 7/1903 | Blue | 65/240 X |
| 1,968,777 | 7/1934 | Bridges | 65/264 |
| 2,151,876 | 3/1939 | Wadman | 65/230 |
| 3,216,813 | 11/1965 | Mumford | 65/241 X |
| 3,644,111 | 2/1972 | Becker | 65/241 X |

Primary Examiner—Richard V. Fisher
Attorney, Agent, or Firm—Emch, Schaffer, Schaub & Todd Co.

[57] ABSTRACT

An apparatus for manufacturing glass bottles is disclosed which includes consecutively delivering gobs of molten glass into a blank mold, forming each gob into a parison, transferring the parisons alternately into at least two sets of blow molds, allowing said parisons to reheat, and expanding the parisons in the blow molds. The sets of blow molds recipricate along a substantially vertical path. A first position where the parisons are alternately received by the blow molds and blown containers removed is located on the vertical path. The parisons are expanded and cooled in the blow molds by blowing them out or by applying a vacuum, or a combination of those means at a second position on the vertical path. The apparatus is an improvement to forming sections of the well known Hartford type I.S. machine.

4 Claims, 6 Drawing Figures

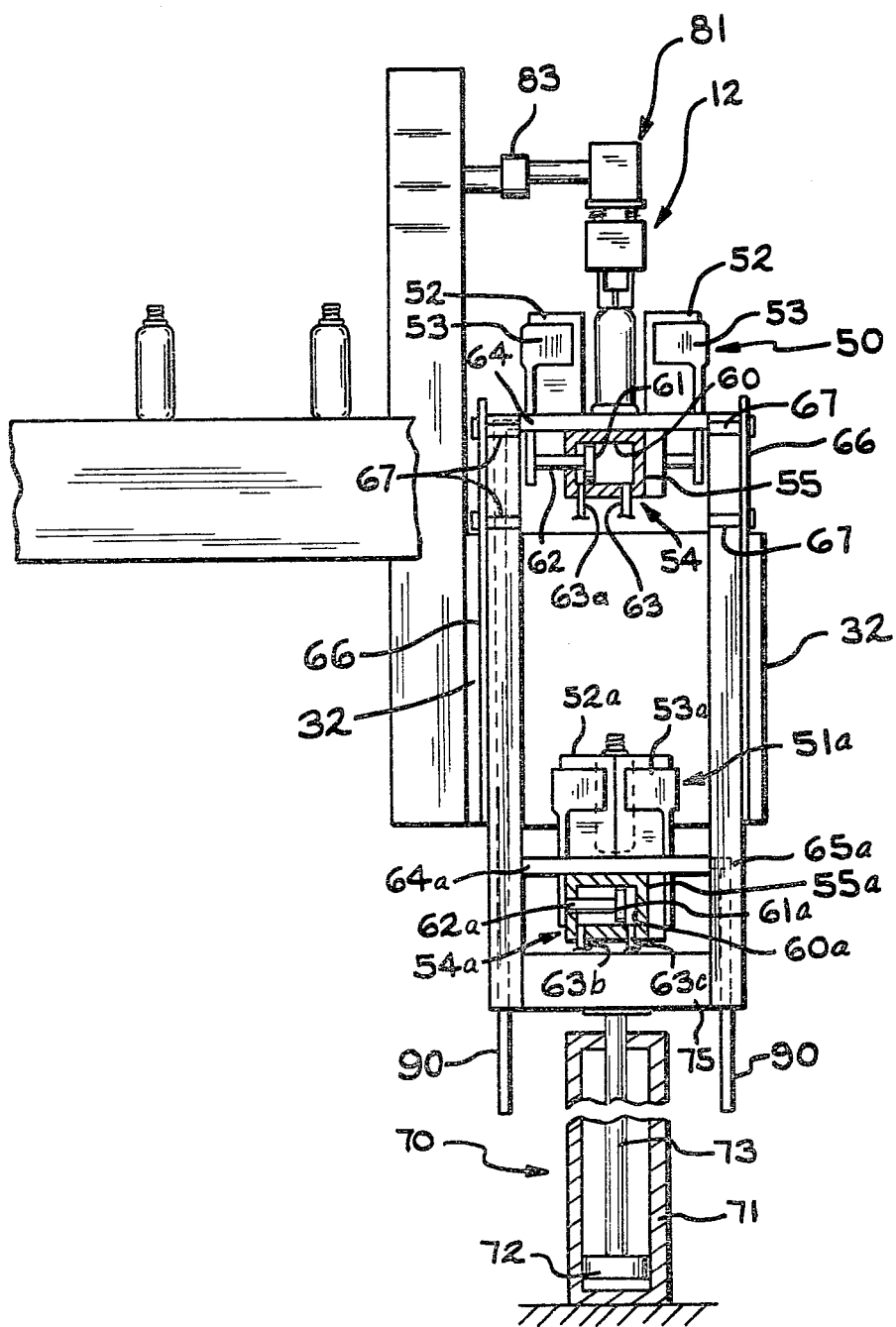

APPARATUS FOR MANUFACTURING GLASS BOTTLES

This application is a continuation-in-part of my pending application Ser. No. 906,048 filed May 15, 1978, now abandoned.

BACKGROUND OF THE INVENTION

In the glass industry today the most common glass container manufacturing machine is the Hartford type "I.S." machine. It is estimated that in the United States alone, there are over six thousand "I.S." sections in daily operation. This machine is described in Ingle U.S. Pat. Nos. 1,843,160 and 1,911,119.

A basic "I.S." eight-section machine today costs several hundred thousand dollars. An important advantage of the present invention is that it is applicable to the existing production facilities of the industry.

In the original disclosure of the I.S. machine, the machine was intended to make glass containers by the well-known "blow and blow" process. Subsequently, Rowe U.S. Pat. No. 2,289,046 disclosed the "62" process which could be applied to the basic machine to enable it to make containers by the "press and blow" process which is the preferred method of manufacturing wide mouth ware or jars. This development enabled the glass industry to use one machine for all types of ware instead of having a "narrow neck" machine like the Owens or Lynch machines for making bottles and a "wide-mouth" machine like the Miller machine for making jars.

The present invention relates primarily to the manufacture of glass containers on the I.S. machine by the well-known "blow and blow" process although there are some instances where it can also be used to advantage in the manufacture of glass containers in the I.S. machine using the "press and blow" process. Although minor variations to the process exist in the industry, the following discussion describes generally the steps which are most common. A gob of molten glass is delivered into an inverted blank mold at the bottom of which is situated a neck ring and a plunger. The gob is blown down into the cavity with compressed air to insure the complete filling of the neck ring. The plunger is then receded, a baffle plate closes the top end of the blank cavity, and compressed air is applied through the orifice created by the withdrawal of the plunger, thereby expanding the glass into intimate contact with the interior surfaces of the blank mold and baffle plate. The glass-to-mold contact is continued long enough to create an "enamel" skin on the outer surface of the resulting glass parison.

The baffle plate is then removed and the blank mold is slightly disengaged from the parison so that the parison is held in a vertical position supported only by the neck ring. At this time, the parison starts to "reheat" which refers to the flow of heat from the interior glass to the outer surfaces of the parison and to the heat reflected from the interior surface of the blank mold to the outer surface of the parison. The step of reheating the parison plays an important role in improving the strength of the final glass bottle. Following this, the neck ring and parison are transferred and inverted to the blow mold position. The blow mold closes around the parison as the neck ring releases its hold, and the parison becomes supported at the top of the blow mold by a finish ring or bead located just below the finish of the parison. The parison, of course, continues to reheat during its transfer to and positioning in the blow mold until the time it is expanded into contact with the interior wall of the blow mold.

After its suspension in the blow mold, compressed air and/or vacuum are applied, at the proper time, to expand the parison to the interior contours of the blow mold. The cooling contact between the blown glass bottle and the blow mold is maintained until the bottle assumes a sufficient degree of rigidity to be capable of standing on its own. Then the blow mold is opened and the glass bottle is removed therefrom and transferred to a cooling plate or conveyor.

As glass bottles have been designed for lighter weights and thinner walls, the length of time required to blow and cool the bottle in the blow mold has decreased significantly. Therefore, in order to maintain the blank side time in the proper relation to the blow side time, it has been necessary to reduce the time available for reheating the parison.

In the ideal production of thin-walled containers, the interval for reheating prior to blowing must exceed a predetermined minimum period of time in order to insure equalization of temperatures in all zones of the parison and to thus achieve uniform viscosity prior to final expansion. Reheating of the parison walls proceeds from the interior zone toward the exterior and, therefore, this step cannot be speeded up appreciably by auxiliary equipment. It also requires more time on containers where the parison has been formed by the "blow and blow" process than as those where the parison has been formed by the "press and blow" process because, in the former there is no plunger contact to cool the interior wall of the parison as there is in the latter process.

Many inventors, recognizing the importance of the "reheat" have proposed means to increase it. These include Wadman U.S. Pat. No. 2,084,285, Wadman U.S. Pat. No. 2,151,876, Becker U.S. Pat. No. 3,622,304, Foster U.S. Pat. No. 4,009,016 and Zappia U.S. Pat. No. 4,058,388. Because none of these disclosures is applicable to the basic "I.S." machine they have not met with commercial acceptance.

It is important to keep the proper relationship between the blank side time and the blow side time to maintain a proper amount of reheating for the parison. In an attempt to improve the reheating time for the parisons additional blow molds have been provided so that the parisons can have additional reheat time without slowing down the parison forming or bottle forming process. The additional blow molds have been added to the bottle forming machine in usually one of two ways in the prior art. An additional set of blow molds can be added to one side of the parison forming equipment so that the parisons can alternately be supplied to each set of horizontally separated blow molds. (U.S. Pat. No. 3,216,813 is one example of this type of prior art system). The additional blow molds add a great deal of width to the bottle forming machine and require an additional parison transfer mechanism to service the additional blow molds. Such a mechanism requires a complete revamping of the forming stations and cannot be used with the standard I.S. machine.

The other prior art solution is to place two sets of blow molds on a horizontally reciprocating mechanism that alternately moves a blow mold set into position to receive parisons (U.S. Pat. No. 2,151,876 is one example of this type of prior art system). Once the first set of blow molds receives parisons the molds are horizontally translated and the second set of blow molds moves into position to receive parisons. The arrangement allows the parisons to have adequate reheat time while the parisons are being transferred to the blow molds and before the parisons are blown or expanded in the blow molds. However, the horizontal movement of the blow molds can cause the parisons to deform or move in the blow molds. Any such movement of the molten glass can produce non-uniformities in the parison that create non-uniformities in the finished blown bottle. Also the parison can deform to an extent, during the horizontal movement, to cause the parisons to contact the surface of the blow molds. Once the parisons contact the surface of the molds heat transfer occurs between the portion of the parison and the mold. The transfer disrupts the reheating of the parison in the area where the parison is in contact with the mold and creates a non-uniform reheating of the parison. The non-uniform reheating of the parison can create weak spots or defects in the finished bottle. The transfer of the parisons from the parison forming molds to the blow molds can also cause the parisons to deform or become off center. The subsequent horizontal movement of the blow molds will tend to magnify any such defects in the parisons and result in unsatisfactory bottles. Accordingly, the prior art solutions to the reheat problems have proven to be inadequate and not adaptable to present machines.

A substantial advantage of the present invention is that it is designed to be used with the Hartford type I.S. bottle forming machines. The Hartford type I.S. machine forming section has a width of under two (2) feet and bottle production facilities are designed to take maximum advantage of this width. The vertically reciprocating blow molds of the present invention can be added to the Hartford type I.S. machine without increasing the width of the bottle forming station of the machine. Thus, the present invention can be used to increase production rate in a bottle forming facility by adding the invention to standard bottle forming machinery.

SUMMARY OF THE INVENTION

The present invention relates to and provides a novel modification to the known bottle forming process whereby reheat time is maintained for thinner and lighter bottles, and production speed is increased. The reheat time itself is maintained or increased by eliminating some or all of the reheat part of the cycle from the blank mold section and placing it in the blow mold section. Sufficient time for reheating and blowing at higher production rates is made available by using a plurality of blow molds for each blank mold. With this arrangement, one set of parisons may be reheated and blown in one set of blow molds while, at a second set of blow molds, blowing of a set of bottles is completed, the bottles are removed and a new set of parisons is delivered. The plurality of blow molds reciprocate along a substantially vertical path and into and out of a position where the parisons are alternately received by the pairs of blow molds. The vertical path falls within the plane of transfer of the parison from the blank mold to the blow molds. The parisons are held in the blow molds for a sufficient period of time to achieve reheating prior to blowing the parisons into bottles. Reheating the parisons in the blow molds can improve the glass distribution because of the gravitational centering of the parisons with respect to the blow molds. This may be necessary if the parisons have been forced off-center by the action of the parison transferring mechanism.

Although the invention is described as having two sets of blow molds it should be noted a greater number of sets of blow molds could be used in this invention. The additional blow mold sets would be positioned so that they reciprocate along the vertical path with the other blow mold sets. In this fashion any number of blow molds could be utilized to obtain the desired amount of reheat time. However, for the sake of explanation, the invention will be described as having two sets of blow molds.

It is therefore, an object of the invention to provide a method and apparatus for manufacturing lightweight glass bottles whereby a substantially increased reheat time is available for promoting the strength of the bottle.

It is further an object of this invention to provide a method and apparatus for manufacturing lightweight glass bottles whereby the production speed and efficiency is increased.

It is still further an object of the present invention to provide a method and apparatus for manufacturing glass bottles whereby the uniformity of glass distribution is improved.

BRIEF DESCRIPTION OF THE DRAWINGS

FIG. 1a is a front and partial sectional view of the reciprocating blow mold apparatus in FIG. 1.

DETAILED DESCRIPTION OF THE INVENTION

The present invention is an improvement in the method of manufacturing narrow neck glass bottles by the well-known "blow and blow" process. However, it will be apparent to the artisan that the method may also be used with the "press and blow" process with some utility. For detailed descriptions of typical apparatus and procedures used in the "blow and blow" process, reference may be had to the following U.S. Pat. Nos.: 1,911,119; 2,289,046; 2,290,798; 2,309,378; 2,355,036 and 2,702,444. Of course, most of the machinery used with other methods, such as "press and blow" are also useful with the present invention and references may be had to such machinery as typically shown in U.S. Pat. Nos. 2,289,046 and 3,024,571. For purposes of understanding the present invention, reference will be made to the simplified illustrations in FIGS. 1–5, and 1a.

Figure 1:
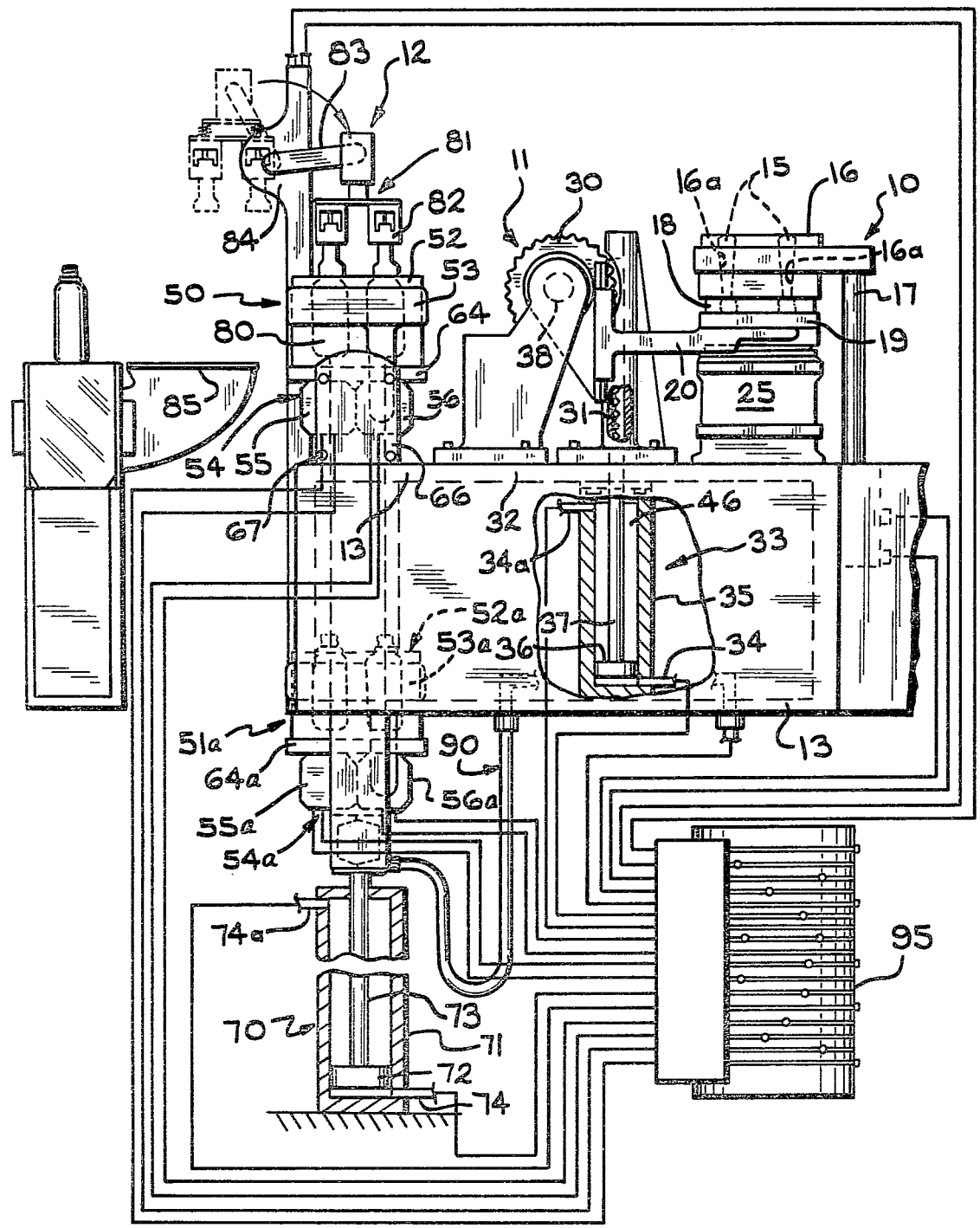
FIGS. 1–5 are overall schematic views of a portion of a glass bottle manufacturing machine illustrating the steps of a preferred method of the present invention.

FIGS. 1–5 depict only that portions of the glass container manufacturing apparatus which is most directly concerned with the method of the present invention, i.e., a parison-forming unit 10, a transfer mechanism 11, and a reciprocating blow mold apparatus 12. FIG. 1a is a front view of the blow mold apparatus 12 as shown in FIG. 1. The apparatus is intended to replace the standard comparable forming station of existing I.S. machines.

For purposes of illustration, FIG. 1 portrays the point during manufacture at which the parisons 15 have already been formed and are ready for transfer. The actual methods and the I.S. machines used for forming the parison 15 in the blow and blow process are well-known in the art and do not constitute a critical part of the present invention. Generally, such parisons 15 are formed by delivering glass charges or gobs to an inverted split blank mold 16 having multiple cavities 16a, and which comprises two mold halves pivotally movable into and out of a parison forming position about a stationary pivot pin 17. The blank mold 16 lies superjacent to a split neck ring 18 supported by a neck ring holder 19, both of which are detachably affixed to a support arm 20 for invert transferring the formed parisons 15 to the blow mold apparatus 12. Immediately below the neck ring 18, and in alignment therewith, is mounted a vertically disposed, generally cylindrical housing 25 which contains the operating mechanism for counter-blowing the glass charges into a pair of parisons 15. In operation, after the glass charges have been delivered to the blank mold 16, the mold 16 is closed at the top with baffles (not shown), and settle blown, by means of compressed air directed into the mold 16 through the baffles, to assure complete molding of the finish threads in the neck ring 18 and to compact the charge. During the time the parisons are settle blown, a neck pin or plunger (not shown) is situated within each neck ring 18, but is subsequently retracted to form a small cavity within the compacted glass charge. Compressed air is counter-blown into the cavity to expand the charge against the molding surfaces of the blank mold 16 and baffles to form the parisons 15. After formation of the parisons 15, the baffles are removed and the parisons are ready to be transferred to the blow mold apparatus, as shown in FIG. 1. Additional information on the formation of the parisons can be found in U.S. Pat. No. 2,151,876 and the patents cited therein.

Figure 2:
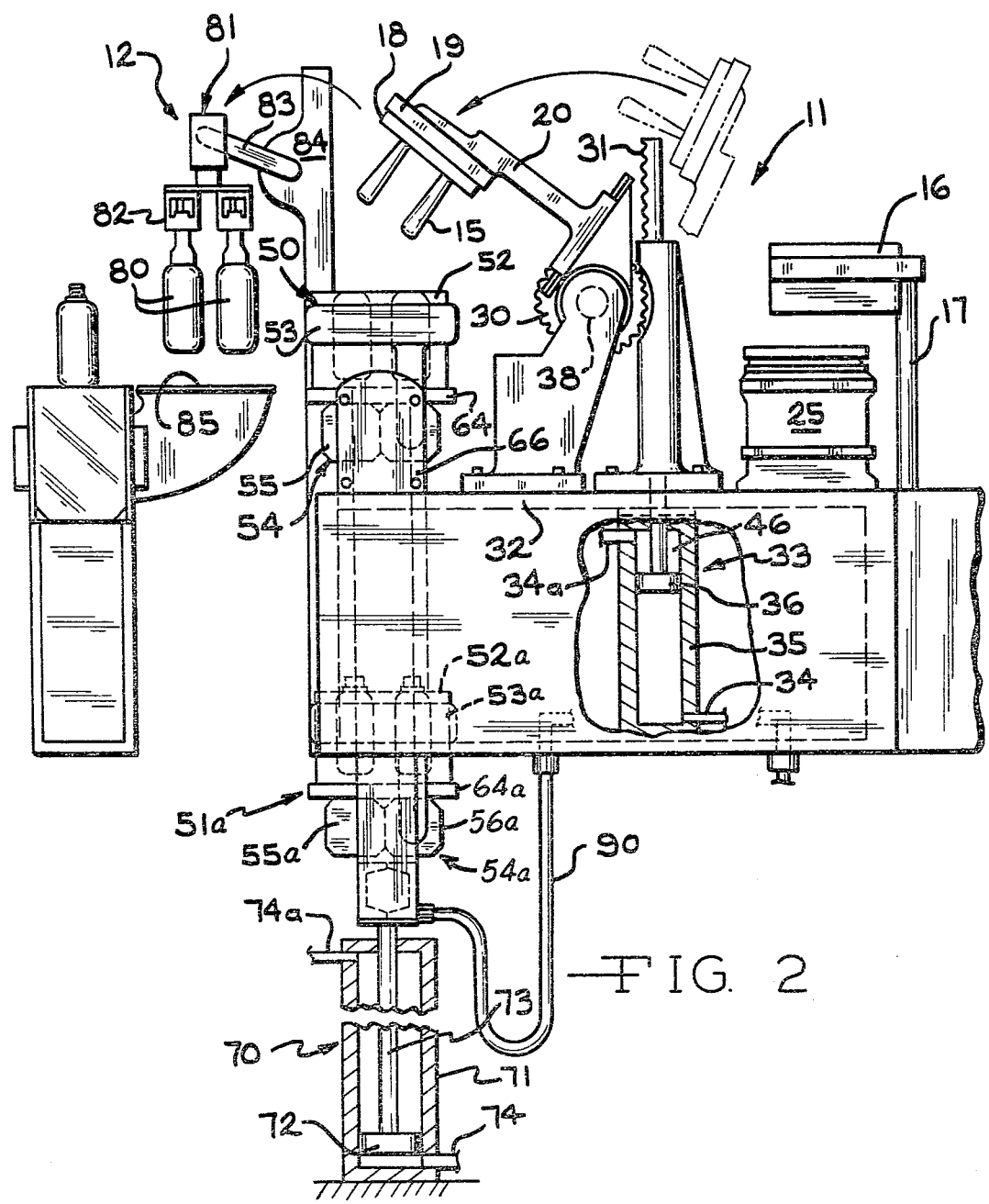

The two halves of the blank mold 16 are then pivoted open and the support arm 20 invert transfers the formed parisons 15, neck ring 18, and neck ring holder 19, to the blow mold apparatus 12, as depicted in FIG. 2. A known transfer mechanism 11 which is suitable for use with the present invention is disclosed in U.S. Pat. No. 3,024,571. Basically, it comprises a pinion 30 and an engaging vertically disposed pinion rack 31, both mounted upon a stationary base or section box 32, and operated by means of a piston and cylinder assembly 33. Compressed air through one inlet 34 of the cylinder 35, pushes the piston 36 and piston rod 37 upward, thereby driving the engaged pinion 30 about its fulcrum shaft 38 and invert transferring the support arm 20 and parisons 15 to the blow mold apparatus 12. In order to return the support arm 20 to the blank side, the air in the cylinder 35 is bled, and additional air is fed through the inlet 34a to the reverse side 46 of the cylinder 35.

In the present invention, the formed parisons 15 are delivered alternately to one of two blow mold stations, 50 and 51, of the blow mold apparatus 12. In FIG. 2 the parisons 15 are being delivered to the upper blow mold station 50.

The mold stations, 50 and 51, include, in the form shown, in FIGS. 1 and 1a, two multiple cavity cooperating mold sections 52, 52a detachably supported respectively by mold holder arms 53, 53a and which are openable and closeable translationly by means of respective piston/cylinder assemblies 54, 54a. Each of the piston/cylinder assemblies 54, 54a, includes two cylinder mechanisms 55, 55a and 56, 56a, each of which operate one of the two cooperating mold sections 52, 52a. For purposes of illustration, one of each of the mechanisms at each blow mold station, 50 and 51, is shown in sectional view in FIG. 1a.

Each cylinder mechanism, 55, 55a and 56, 56a includes a respective cylinder 60, a piston 61, a piston rod 62, and two air inlets 63 and 63a for the upper cylinder assembly 55, and 63b, 63c for the lower cylinder assembly 55a. The piston rods 62 are connected to the respective mold holder arms 53, 53a. In each of these sections compressed air is introduced, through the inlet 63 or 63a, into the cylinder 60 and pushes the piston 61 and piston rod 62 outward, thereby opening the mold sections 52, as illustrated by the upper blow mold station 50 in FIG. 1a. When compressed air is applied through the other inlet 63a or 63b, and the air on the opposite side of the piston 61a is allowed to evacuate, the piston rod 62 or 62a is forced back into the associated cylinder 60a, thereby closing the mold sections 52 or 52a, as shown by the lower blow mold station 51 in FIG. 1a. Movement of the piston rods causes the mold holders arms 53, 53a to move to open and close the mold sections. The mold holder arms and mold sections are caused to move along a plane that is perpendicular to the longitudinal axis of the bottles formed in the mold sections. Thus, the mold sections move translationly away from and towards one another during the opening and closing of the mold sections. This expedient, combined with the vacuum force holding the mold closed, greatly reduces the complexity of the mold operating mechanism.

Each of the pair of stations, 50 and 51 is supported upon a respective plate 64, 64a which is affixed to laterally spaced sliding bars 65, 65a and finally aligned to the stationary base 32 by means of a respective bracket 66 66a. Bearings 67 affixed to the brackets assure horizontal alignment. The sliding bars 65, 65a and thus the stations 50 and 51, are reciprocated up and down by means of a piston/cylinder assembly 70, for a purpose to be explained below. The piston/cylinder assembly 70 includes a cylinder 71, piston 72, piston rod 73, air inlets 74 and 74a, and a drive plate member 75. Compressed air admitted into the cylinder 71 through the air inlet 74 pushes the piston 72 and rod 73 upward, thereby resulting in the drive member 75 raising the stations, 50 and 51. Compressed air admitted to the other side of the piston 72 through the air inlet 74a pushes the piston 72 downward, thereby lowering the blow mold stations, 50 and 51.

The timing of opening and closing the blow mold sections 52 is controlled to coincide with the removal of the finished bottles 80 and delivery of the formed parisons 15, as shown in FIGS. 1 and 2. Removal of the finished bottles 80 is accomplished by means of a conventional takeout jaw assembly 81. The takeout jaw assembly 81 includes pairs of takeout jaws 82 supported by a takeout arm 83 which is pivotally mounted on a bracket 84 (FIG. 2). Thus, finished bottles 80 are removed from the blow mold sections 51 and 52 and delivered to a dead-plate 85 where they are subsequently transferred to a hot end treatment station (not shown) and an annealing lehr (not shown).

Expansion of the parisons 15 is preferably performed by applying a vacuum through slits or apertures (not shown) within the mold sections 51 and 52. The vacuum lines may comprise flexible hoses 90 connected to the hollow interior of each of the sliding bars 65. The vacuum within the sliding bars is utilized to expand the parisons 15 in a known manner. The valve controlling the vacuum to the mold is located as close to the mold as possible as is known in the art. Vacuum expansion is preferred in order to promote uniformity in glass distribution and to assist in holding the mold sections 52 together. However, blow expansion would also be suitable. Additional information on expanding the parisons into bottles can be found in U.S. Pat. No. 1,911,119.

Figure 3:
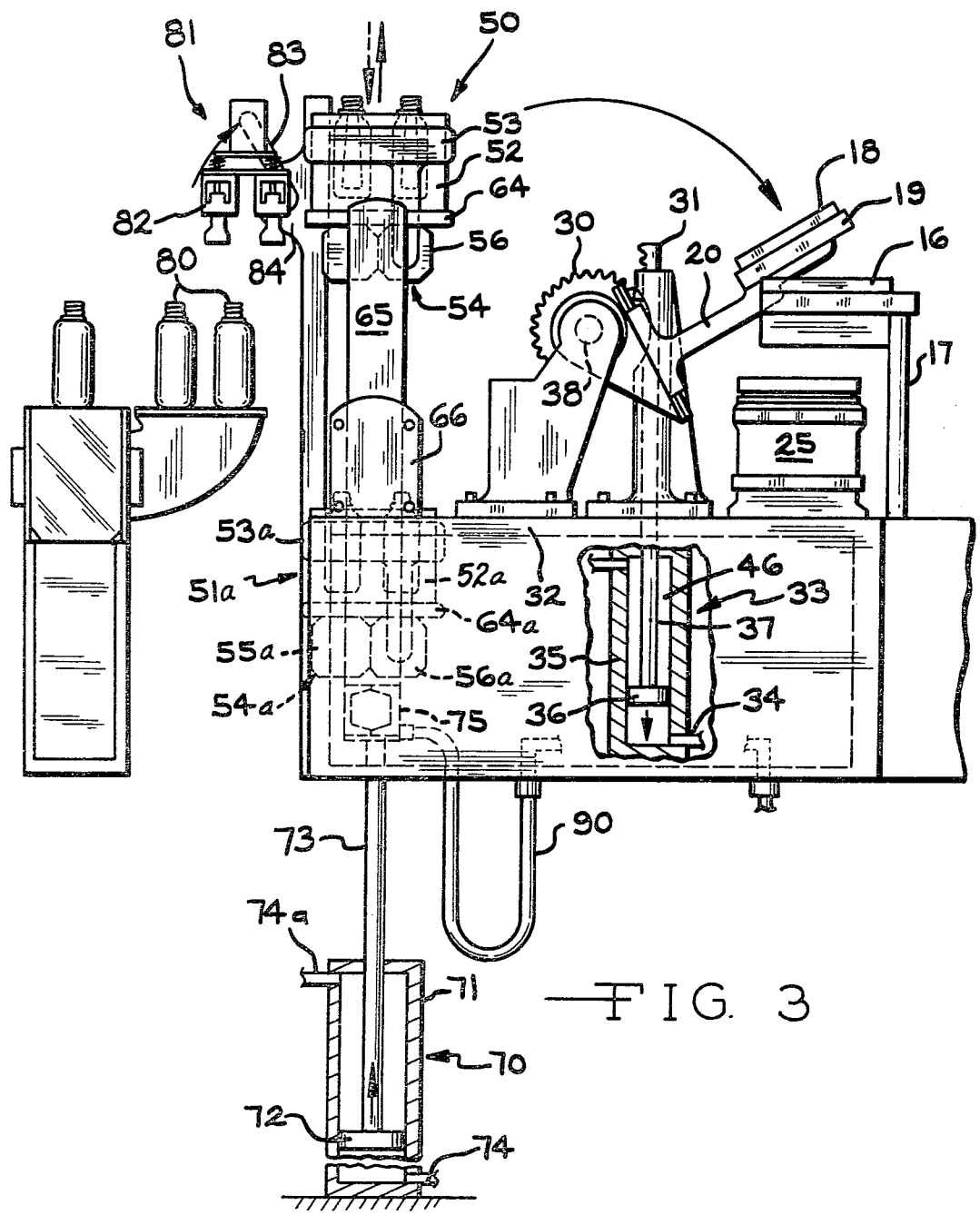
Figure 4:
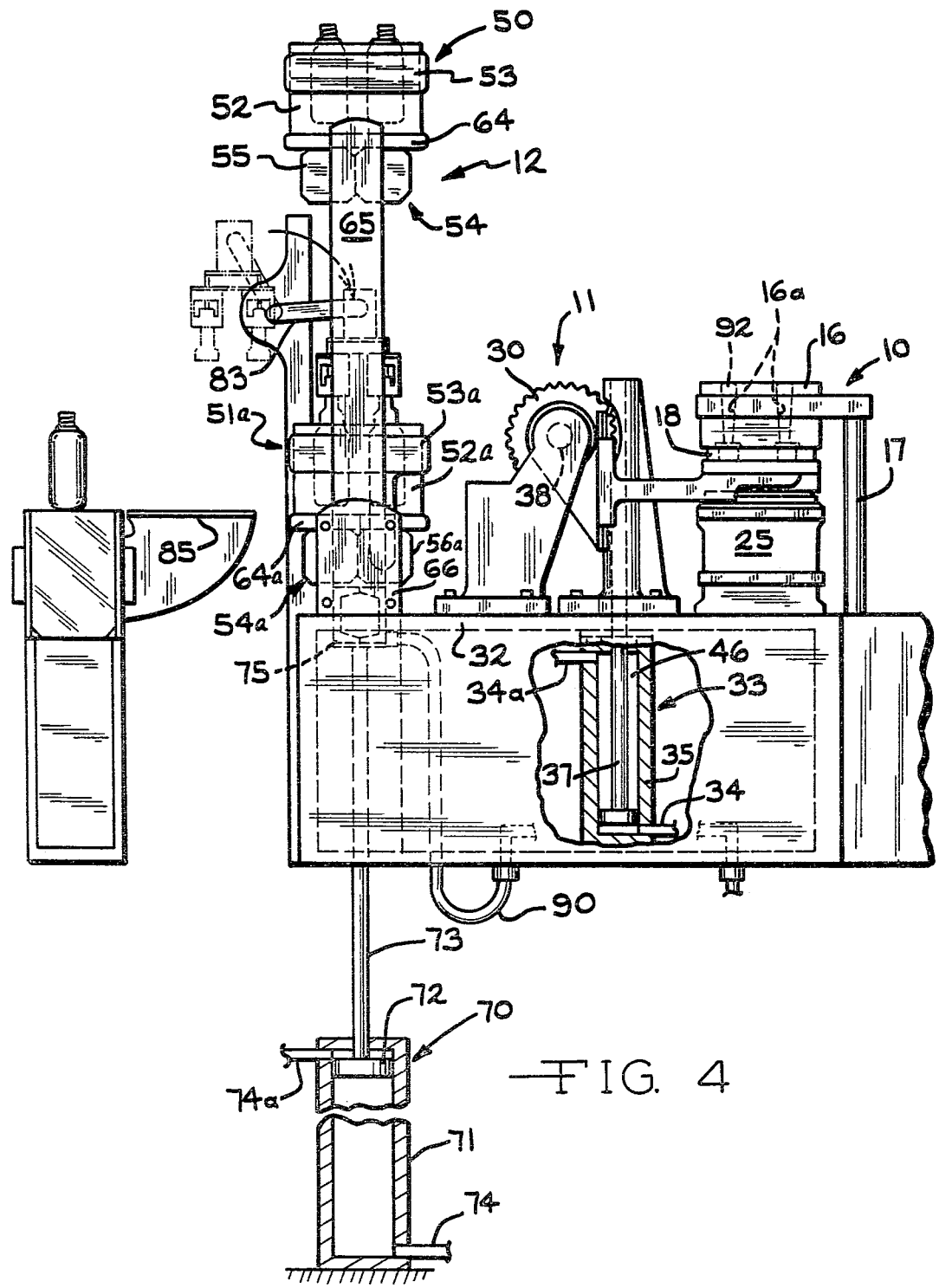
Figure 5:
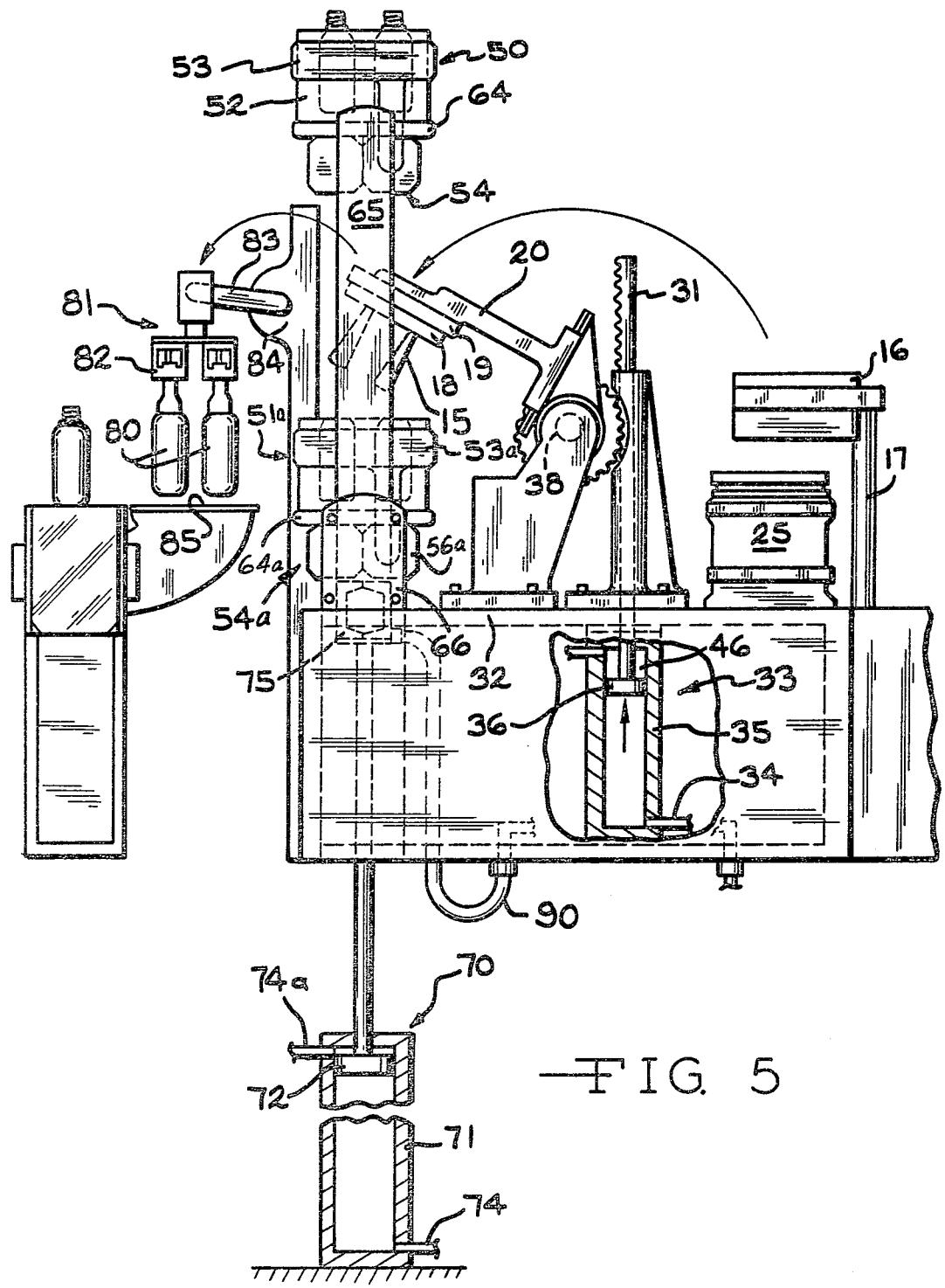

After the finished bottles 80 are removed from the mold sections 52 of the upper blow mold station 50 and the formed parisons 15 are delivered thereto, the piston/cylinder assembly 33 of the transfer mechanism 11 is actuated to return the neck rings 18 to the parison-forming unit 10. The piston/cylinder assembly 70 is then actuated to raise the stations, 50 and 51. This is shown in FIG. 3. When the lower blow mold station 51 reaches the takeout position, the blow mold sections 52 are opened by action of the piston/cylinder assembly 54, the finished bottles 80 are removed by the take-out mechanism 81 and the new parisons 15 are positioned in the mold sections 52, as shown in FIG. 5. The mold sections 52 are immediately closed by the action of the piston/cylinder assembly 54 and then the piston/cylinder assembly 70 is actuated to lower the blow mold stations, 50 and 51, to the position shown in FIG. 1 and the process is repeated. Thus, one parison forming unit 10 is used to supply parisons to mold stations. The mold stations are reciprocated in a substantially vertical plane to a takeout position where the finished bottles are removed and another set of parisons supplied to the mold station. The mold stations are then reciprocated until the other mold station is in the takeout position and the process is repeated for that mold station.

The expansion of the parisons 15 in the upper mold station 50 can start at any time after delivery of the parisons, even while the station 50 is in motion. The reheating of the parisons continues to take place during the transfer from the parison forming unit and while the parisons are in the mold stations prior to blowing. Reheating will occur in the mold stations as long as the parisons are not in contact with the walls of the mold. A portion of the reheat time in the mold stations will occur when the mold stations are in motion. However, since the mold stations move in a vertical direction the parisons are not caused to deform or shift off center in the mold stations. In fact, the reheating in the mold stations will serve to redistribute any hot glass in the parison that has shifted off center due to the forces generated in transferring the parison forming unit to the mold stations.

The amount of reheating time available is dependent on the length of time between the point at which the parisons are removed from the contact with the blank mold and the point at which the parisons are fully expanded in the mold. By utilizing two blow mold stations the parisons can remain in the molds for a longer period of time for reheating without causing the bottle production operation to slow down. The reciprocating cycle of the mold stations, the opening and closing of the molds, the blowing of the parison into a bottle and the reheat time alotted in a particular bottle can all be controlled to achieve the best possible results.

A timing drum 95 is usually used to control the transfer of the parison, the reciprocation of the mold stations, the opening and closing of the molds, the blowing of the parisons into bottles and the removal of the bottles from the mold stations. An example of suitable timing drum arrangement is shown in U.S. Pat. Nos. 2,084,285 and 2,151,876 although it should be noted that almost any mechanical or electrical control device can be used to control the bottle forming process. The timing drum or other control device used are standard components in this industry and as such are not part of applicant's invention. The control of the above functions by the timing drum provides considerable flexibility in selecting the amount of reheat time and consequently blow time for the bottles that are manufactured. This flexibility is necessary to allow the machines to manufacture bottles of different designs at maximum production speed for each design.

For example the timing drum 95 may be set up to offset the different effects of gravity on the parisons within the two sets of blow molds. When the sets of blow molds 50 moves up from the receiving station the parisons therein will tend to elongate while in the set of blow molds 51 that move down from the receiving station the parisons will tend to be compressed.

It should be apparent that, while a preferred embodiment of the present invention has been described above in detail, other embodiments or modifications thereto will be obvious to persons skilled in the art without departing from the scope of the invention as defined in the following claims.

What I claim is:

1. Apparatus for manufacturing glass containers comprising:
   first and second blow molds,
   means for supporting said blow molds and means for reciprocating said supporting means along a substantially vertical path to bring said first and second blow molds into and out of a receiving position;
   means for delivering parisons to said blow molds when said blow molds are located at said receiving position;
   means for expanding the parisons in the blow molds into containers when said blow molds are out of said receiving position; and
   means for removing the expanded containers from the blow molds when the blow molds are located at the receiving position.

2. Apparatus of claim 1 wherein the blow mold supporting means includes a sliding bar positioned in a substantially vertical plane.

3. Apparatus in accordance with claim 1 in which the parison expanding means is individually adjustable in each of the blow mold stations.

4. Apparatus in accordance with claim 1 in which said first and second blow molds comprise cooperating half mold sections, and means to open and close said mold sections in a translational movement along a plane perpendicular to the longitudinal axis of containers formed in said blow molds.

* * * * *